April 2, 1963 W. ZEIDLER 3,083,548
UNIVERSAL JOINT

Filed June 21, 1961 3 Sheets-Sheet 1

Inventor:
Willi Zeidler
By Watson, Cole, Grindle & Watson
Attys.

April 2, 1963　　　　　W. ZEIDLER　　　　　3,083,548
UNIVERSAL JOINT

Filed June 21, 1961　　　　　　　　　　　3 Sheets-Sheet 2

Inventor:
Willi Zeidler
By
Watson, Cole, Grindle & Watson
Attys.

April 2, 1963 W. ZEIDLER 3,083,548
UNIVERSAL JOINT
Filed June 21, 1961 3 Sheets—Sheet 3

Inventor:
Willi Zeidler
By
Watson, Cole, Grindle & Watson
Attys.

United States Patent Office 3,083,548
Patented Apr. 2, 1963

3,083,548
UNIVERSAL JOINT
Willi Zeidler, Dusseldorf, Germany, assignor to Firma
Rheinmetall G.m.b.H., Dusseldorf, Germany
Filed June 21, 1961, Ser. No. 118,661
Claims priority, application Germany June 25, 1960
7 Claims. (Cl. 64—21)

The invention relates to a universal joint comprising an internal ball and an external socket head embracing the same, both of which are equipped with arcuate running grooves for the balls to transmit the torque from the driving side to the take-off side.

In known joints of this kind, the balls are held by a cage, the internal surface of which is in contact with the ball head, whilst its external surface is in contact with the inner surface of the socket. In this arrangement, the use of said cage is compulsory, since, in order to obtain the necessary synchronization of the joint, the balls must be directed into the direction of the line bisecting the angle between driving and driven shaft. This directing or controlling action necessitates usually special and additional devices which tend to complicate further the already rather complicated construction of the joint.

According to the invention, all these drawbacks may be avoided in that the balls are equipped with crossing running grooves, of which the grooves of the inner ball head form the mirror image of the grooves of the outer socket head.

By means of this arrangement, the required synchronization between driving and driving side of the joint may be achieved with very simple means, because the crossing ball running grooves, the depth of which corresponds to half the ball diameter and arranged in the ball head and socket, afford the required space only within the zones at which the grooves cross, that is to say, exactly in the direction of the line bisecting the angle between the driving and the driven side, which space the balls cannot leave without disintegrating.

The invention will be further described, by way of example, with reference to the accompanying drawing, showing one embodiment thereof:

Figure 1:
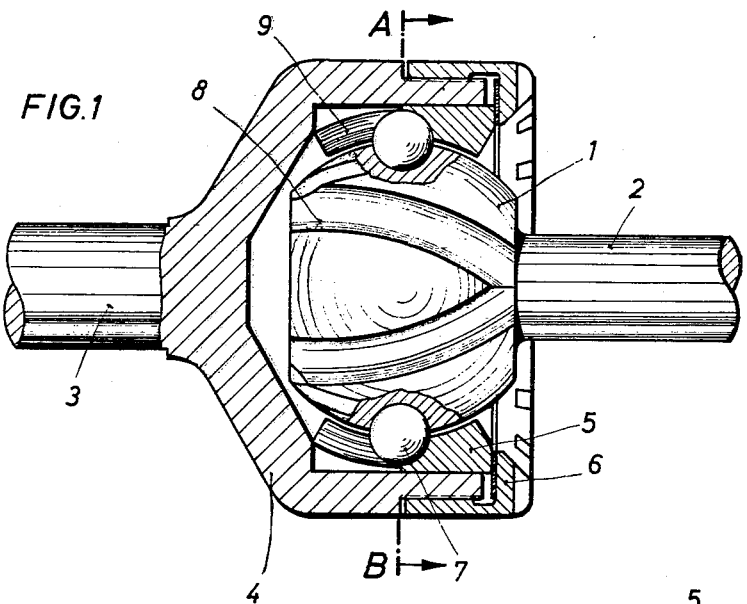
FIG. 1 is a cross-section of the new joint in the axial direction in the undeflected condition.

In FIG. 1, the inner ball head 1 carries, for example, the driving pivot 2 of the joint. The outer part of the joint with the driven pivot or shaft end 3 comprises a housing body 4 which may be seen to contain a number of substantially triangular, cylindrically arcuate segments 5. These segments cooperate after the manner of wedges and form in this manner an expanding ring which is biased, in the case of the drawing, by a cap nut 6.

For the transmission of the torque, there may be, for example, between parts 1 and 4/5, six balls 7, arranged as known to the art, cooperating with running grooves 8 in the ball head and running grooves 9 (FIG. 1) in the ball socket, that is to say, in the segments 5. The depth of these grooves corresponds substantially to half the diameter of the balls. These running grooves cross one another, so that the individual crossing points 10 (see especially FIG. 4) of these half-grooves in ball head and ball socket form chambers capable of receiving the ball so that this ball is guided by the walls of this chamber.

As may be clearly seen, these crossing points are always in the direction of the lines bisecting the angle between the drive and driven sides of the joint, so that the absolute and completely positive synchronization of the parts of the joint is obtained merely by means of the crossing grooves, that is, without additional guide means.

As shown in the drawing, the ball grooves in both ball heads are open towards the front sides, so that they may be machined very economically, by means of comparatively large diameter—and therefore efficient—and stable tools, such as, for example, side milling cutters and grinding discs.

Figure 2:
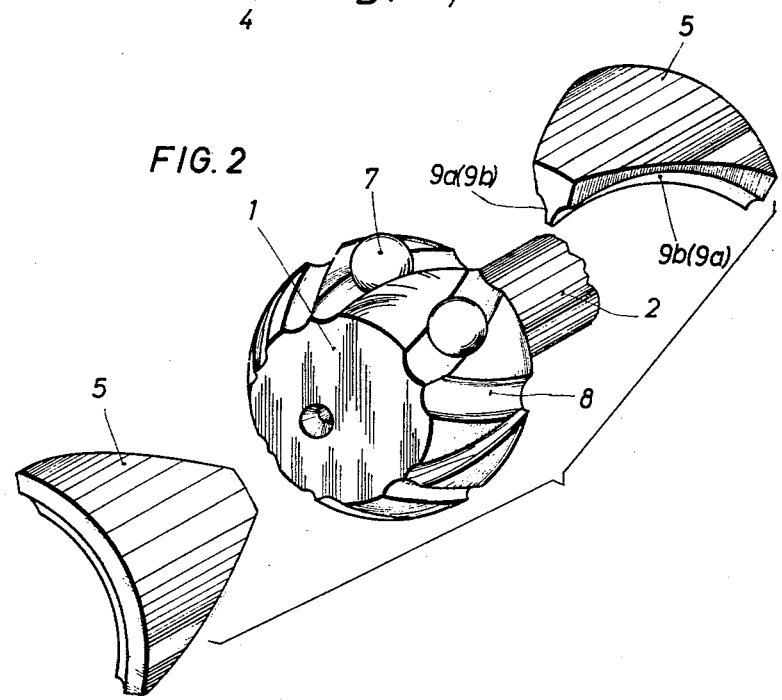
FIG. 2 is a detail of FIG. 1 viewed in perspective.
Figure 3:
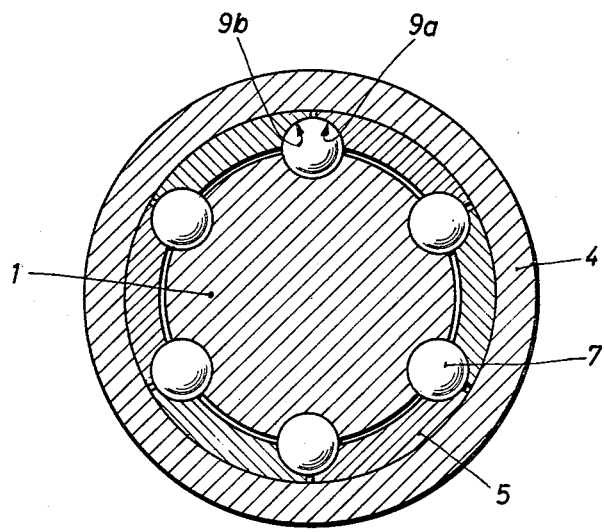
FIG. 3 is a cross-section along the line A—B in FIG. 1.
Figure 4:
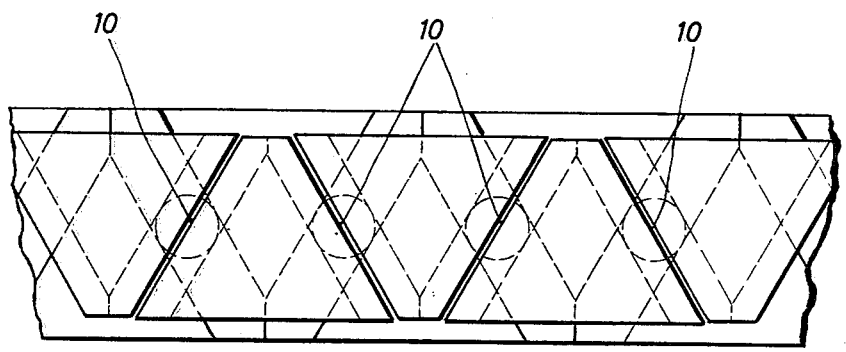
FIG. 4 is a development showing also the construction of the hollow ball socket of segments and the crossing points of the ball grooves.
Figure 5:
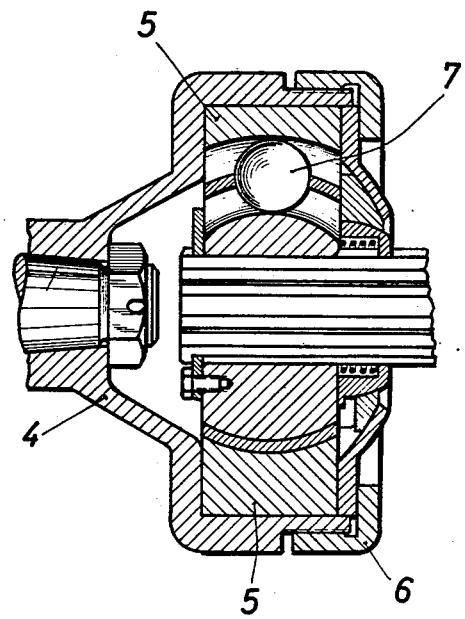
FIG. 5 shows a modified embodiment and indicates the application of the principle of the invention to joints according to U.S. Patent 2,010,899.

As may also be seen in FIGS. 2 and 4, the running grooves in the ball socket are always formed by two halves 9a and 9b of the groove, machined along the wedge-shaped inner edges of the segments 5.

The invention is not limited to the embodiment described in the foregoing and shown in the drawing which only have the purpose of explaining the principle of the invention. Thus, for example, the ball socket, assembled from segments and acting as expanding ring, might be utilized simultaneously as overload safety device for the joint. For this purpose it is only necessary to tighten the expanding ring consisting of segments 5 by means of suitable tightening or biasing means, such as spring-loaded screws in such a way that the tension ring slips in the housing when the maximum torque, for which the joint has been designed, is exceeded.

In certain cases, the expanding ring formed of segments 5 may be designed to be fixed by special means, for example, by pins, cams, wedges, grooves, or the like, or design these means as overload fracturing points.

The segment-shaped construction of the outer ball socket head may be also applied to other types of homokinetic joints, for example, the joint disclosed by Rzeppo in U.S. Patent 2,010,899. By means of this special measure, the manufacturing costs of these known joints could be considerably reduced, because the extraordinarily complicated, difficult and time-wasting machining of the ball grooves on the ball socket may be replaced by a more simple finishing method. Possibly also, the segments including the grooves might be produced in all cases by manipulating treatment, for example by pressing, forging, drawing or the like, and the manufacture might thus be cheapened yet further.

Finally, in some cases it might also be of advantage to design the ball grooves in the axial direction not straight but in the form of curves.

What I claim is:

1. Universal joint comprising an inner ball head, an outer hollow housing, said inner ball head having arcuately-shaped grooves therein, a plurality of balls in the grooves to transmit the torque between the drive and driven side of the joint, and triangular-shaped segments in the outer hollow housing with partial grooves therein and arranged in a circular ring in the inside of the outer hollow housing and arranged adjacent to each other, the depth of the grooves being substantially equal to one half of the diameter of the balls and the grooves of the inner ball head and the segments crossing one another so that each groove of the ball head crosses the groove in the segment to form a chamber to receive its ball to transmit the torque.

2. Universal joint according to claim 1, in which means are provided on the outer head so that the ring formed by the segments is so tightened against the outer housing of the joint that a frictional lock is formed between the circular ring and outer housing of the joint exceeds by a small amount the maximum torque to be transmitted by the joint.

3. Universal joint according to claim 1, in which means are provided on the outer head so that the ring formed by the segments is so tightened against the housing of the joint that a frictional lock is formed between the circular ring and outer housing of the joint to exceed by a small amount the maximum torque to be transmitted by the joint, the point of impact of the individual segments are directed in the direction of the axis of symmetry of the ball grooves.

4. Universal joint according to claim 1, in which the segments are arranged in the outer housing alternately at to the direction of the apex of the triangular shapes of the segments.

5. Universal joint according to claim 1, in which the ball grooves are curved as viewed in the direction of the axis of the joint.

6. Universal joint comprising a shaft with an inner ball head thereon, an outer hollow housing with a shaft secured thereon and into which the ball head projects, the inner ball head having arcuate grooves therein, a plurality of approximately triangular segments secured in the hollow space of the outer housing and arranged therein in a circular ring path with the segments arranged in alternate adjacent formation relative to the apex of each segment, and means on the outer housing to maintain the segments therein, the depth of the grooves being substantially equal to one half of the diameter of the balls and the grooves of the inner ball head and the segments crossing one another so that each groove of the ball head crosses the groove in the segment to form a chamber to receive its ball to transmit the torque.

7. Universal joint according to claim 6, in which each segment has a pair of partial grooves along the sides thereof from the base to the apex.

References Cited in the file of this patent
UNITED STATES PATENTS

| | | |
|---|---|---|
| 2,102,850 | Koppei | Dec. 21, 1937 |
| 2,134,508 | Floyd | Oct. 25, 1938 |
| 2,321,448 | Anderson | June 8, 1943 |
| 3,002,364 | Bellomo | Oct. 3, 1961 |